United States Patent Office 3,598,748
Patented Aug. 10, 1971

3,598,748
ARYLDIAMINE AND ALDEHYDE REACTION PRODUCT CURING AGENTS FOR URETHANE RESINS
Frank N. Hirosawa, Monterey Park, Calif., assignor to Furane Plastics Incorporated, Los Angeles, Calif.
No Drawing. Continuation-in-part of application Ser. No. 358,931, Apr. 10, 1964. This application Nov. 15, 1967, Ser. No. 683,161
Int. Cl. C08g 51/84
U.S. Cl. 252—182
12 Claims

ABSTRACT OF THE DISCLOSURE

A curing agent and hardener specifically for urethane resin compositions, is made by processing 4,4'-methylene bis(2-chloroaniline) or 3,3'-dichlorobenzidine, or mixtures thereof, with specific active aldehyde compounds, which agent is a liquid, readily dispersed in a wide variety of urethane resin compositions, and resulting in room temperature curing of said urethane compositions.

CROSS-REFERENCE TO RELATED APPLICATIONS

This application is a continuation-in-part of my copending application, Ser. No. 358,931, filed Apr. 10, 1964, now abandoned.

This invention relates to curing and hardener compositions in liquid form for use in the production of cured urethane resins. More particularly, it relates to the preparation of high molecular weight urethane polymers by reaction of isocyanates with organic nitrogen compounds.

Polyurethane polymers, particularly elastomers, are useful because of their unique properties, such as high strength and elasticity, good load-bearing capacity and resilience, high tear strength, resistance to oils, oxygen and ozone, good low temperature properties, and exceptional abrasion resistance. Polyurethane polymers are formed by reacting a di- or poly-functional isocyanate with polyether polyols or with hydroxy-terminated polyesters.

In reacting monoisocyanate with a compound containing a simple reactive hydrogen, a single urethane is formed; if the two reactants are bifunctional, the resultant product is polymeric; and if one of the reactants is polymeric, the ultimate product will be a polymer of high molecular weight. Such a compound with reactive isocyanate-terminated polymers that may be further chain extended, cross-linked, cured or hardened to high molecular weight compounds is represented, typically, in the following equation:

$$2(O{=}C{=}N{-}R{-}N{=}C{=}O) + (HOR'OH) \longrightarrow$$
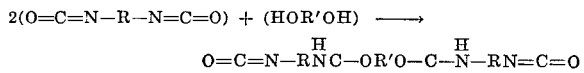

The isocyanate-terminated reactive intermediate reaction product is known in industry as (1) an isocyanate terminated prepolymer, or (2) a polyurethane prepolymer, or (3) a polyisocyanate prepolymer. The prepolymer which contains an excess of unreacted isocyanate groups may be subsequently chain extended, cross-linked or cured by reaction with an arylene diamine, producing linkage of the substituted urea type as for example in the following equation:

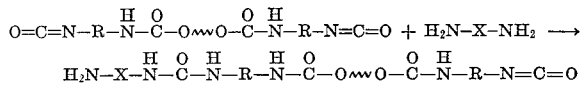

The reaction of the type shown above has been employed in the preparation of the polyisocyanate prepolymer, and this prepolymer has a viscosity range from several hundred centipoises to viscous syrupy materials.

The reaction of isocyanate with compounds that contain nitrogen hydrogen bonds has been found to be governed primarily by the basicity or nucleophilicity of the nitrogen-hydrogen bond, and the basicity of aromatic amines is decreased when electronegative groups, such as halogen atoms or nitro groups are introduced into the nucleus; ortho-standing groups especially exert the greatest effect. It is generally recognized that arylamine cured elastomers have higher moduli, increased tensile strengths, better tear strengths, greater solvent resistances, and usually require much shorter cure time than do glycol cured elastomers.

In spite of the superiority of the aryl diamines (for example, 4,4'-methylene bis(2-chloroaniline) and 3,3'-dichlorobenzidine) as curing agents for urethane resins, wherein good physical properties and long working life of the final polymers are attained, the use of these materials is attended with certain disadvantages that have limited more widespread acceptance. Specifically, these substances have relatively high melting points, making it difficult to get a uniform mix. The initial mixing is sometimes effected by powdering the curing agent, but even then, due to the elevated melting point, the material must be melted and uniformly dispersed in the polyisocyanate prepolymer, which it is intended to cure. This heating to attain melting shortens the working life considerably and at times the mixture sets to an insoluble, infusible polymer before it can even be mixed properly.

The principal object of the present invention is to provide a urethane hardening agent in liquid form comprising the reaction product of an aryldiamine compound selected from the group consisting of 4,4'-methylene bis-(2-chloroaniline) and 3,3'-dichlorobenzidine, and a reactive aldehyde compound selected from the group consisting of formaldehyde, acetaldehyde, glyoxal, and glutaric dialdehyde.

Another object is to provide a new curing agent in liquid form for easy uniform mixing with the polyisocyanate prepolymer, which results in the attainment of the optimum properties even when the mixture is cured at ambient room temperature.

Another object is to provide a liquid curing agent that can be used as a hardener, cross-linking agent or chain extender for polyisocyanate prepolymers, at ambient room temperature or at slightly elevated temperatures.

Another object is to provide a liquid curing agent that can be compounded with conventional compounding ingredients such as carbon black, silica, or coloring ingredients, and be subsequently mixed with polyisocyanate prepolymers to form highly useful polyurethane elastomers.

I have discovered that by reacting 4,4'-methylene bis(2-chloroaniline), or 3,3'-dichlorobenzidine, or mixtures thereof, with certain reactive aldehyde compounds, specifically formaldehyde, acetaldehyde, glyoxal, and glutaric dialdehyde, a new room temperature curing, noncrystallizing liquid hardener or curing agent is obtained, which not only produces the desired final physical properties but also gives a reduction in viscosity and a lengthening of the working life of a hardener-polyisocyanate mixture. The working life is considerably longer than is possible with the use of the conventional dry powder curing agents such as MOCA (4,4′-methylene bis(2-chloroaniline)), DCB (3,3′-dichlorobenzidine), and the like. These new urethane curing or hardening agents in liquid form which are produced by pre-reacting a mixture of certain aryldiamines and certain reactive aldehyde compounds are complexes of undetermined structure; they do not crystallize out of the reaction mixture nor from subsequent solutions. Water is liberated in the forming reaction, and is removed. There is an increase in viscosity during formation, the viscosity being determined by the proportions of the compounds used in the reaction. I have further discovered that the viscosity of my new curing agents may be further controlled by their subsequent compounding with certain high-boiling miscible liquids such as phosphate and phthalate esters.

The ratio of the selected aryldiamine to aldehyde compound is selected so that the desired viscosity of the hardener is obtained, limited by the viscosity that can be tolerated in the final urethane resin mixture. The preferred ratio is in the range from one-half to one-fifth by weight of the selected aldehyde compound, based upon the final reaction mixture.

In general, for the preparation of such a liquid hardener composition, the selected amount of 4,4′-methylene bis (2-chloroaniline), or 3,4′-dichlorobenzidine was melted, and the appropriate amount of the selected active aldehyde compound was then added slowly over a period ranging from about 5 to 60 minutes. After the completion of the first stage of the reaction, the mass was heated to 120°–200° C. to complete the reaction. The water formed in the reaction was distilled off, e.g., under reduced pressure (20–40 mm. Hg) to a pot temperature of 120°–200° C.

EXAMPLE 1

Five hundred parts by weight of 4,4′-methylene bis (2-chloroaniline) was placed in a suitable flask equipped with means for mechanical agitation, a thermometer and a heating mantle. The contents were stirred and gradually heated to about 110° C. The supply of heat was then cut off and the contents of the vessel cooled down to about 90° C. and 17 parts by weight of 37% formaldehyde added gradually over a period of 15 minutes. The temperature of the reaction was permitted to drop to about 50° C. and maintained at this temperature for an additional one hour. The contents of the vessel were then heated under a reduced pressure of 30 mm. Hg to a pot temperature of 150° C. to remove the water. The contents of the vessel were then cooled down to room temperature and stored in a sealed container in a dry atmosphere to avoid excessive moisture pickup.

The resulting high viscosity liquid curing agent did not crystallize upon prolonged storage at room temperature, or under refrigerated conditions. When tested after being kept for one month in a 150° F. air circulating oven, the material remained stable, retaining its fluidity and its excellent curing properties.

EXAMPLE 2

The liquid curing agent prepared as in Example 1 above may be mixed with a polyisocyanate prepolymer and the mass cured at room temperature to provide a resilient, tough, rubber-like elastomer.

The liquid polyisocyanate prepolymer used as described above with my new curing agent consisted preferably of the reaction product of (1) polypropylene ether glycol, and (2) an 80/20 mixture of 2,4- and 2,6-tolylene diisocyanate, the proportion being one to two moles by weight.

The polymeric polyols which may be used to prepare the isocyanate-terminated prepolymer include the polyalkylene ether glycols; the polyalkylene-arylene ether glycols; the hydroxy terminated polyesters, such as polyethylene adipate, polyethylene sebacate, and the like. The polyols may be represented by the formula $$HO(RO)nH$$

where R is either an alkylene radical containing up to 10 carbon atoms, or an alkylene-arylene-ester-group-containing molecule, and $n$ is an integer sufficiently large so that the molecular weight of the polymeric polyols is about 400 to 6000.

Any of a wide variety of organic diisocyanates may be employed to prepare the polyisocyanate prepolymer. Suitable compounds include: 2,4-tolylene diisocyanate; 1,5-naphthalene diisocyanate; m-phenylene diisocyanate; hexamethylene diisocyanate; 3,3′-dimethyl-4,4′-biphenylene diisocyanate; 4,4′-methylene bis (phenyl isocyanate), and the like.

EXAMPLE 3

The curing agent of this invention is particularly suited for chain extending, cross-linking, or curing polyisocyanate prepolymers that are low in viscosity at room temperature, such as those having amine equivalents in the range of 200–2000. For each 100 parts by weight of polyisocyanate prepolymer having an amine equivalent of about 600, 20 parts by weight of the curing agent prepared as in Example 1 were used; the mixture was cured at room temperature for 3 days to obtain a urethane elastomer having tensile strength of about 4,400 p.s.i., elongation of 470 percent and Shore A hardness of 85. For other prepolymers having higher or lower amine equivalents, the proportions of hardener varies from about 10 parts to 40 parts for each 100 parts of the prepolymer.

EXAMPLE 4

When 3,3′-dichlorobenzidine was substituted for 4,4′-methylene bis (2-chloroaniline) as in Example 1, a low viscosity hardening agent having an equivalent weight of 120 was obtained. Twenty parts by weight of this hardener were mixed thoroughly with 100 parts by weight of prepolymer (amine equivalent of 400) and a mixture was obtained that had a pourable working life of 1 hour at 75° F., and when compared with an equivalent cure prepared from dry powdered 3,3′-dichlorobenzidine, which had a working life of 8 minutes at 150° F., both products showed comparable physical properties after 7 days cure at room temperature.

EXAMPLE 5

750 parts by weight of 4,4′-methylene bis (2-chloroaniline), and 250 parts by weight of 3,3′-dichlorobenzidine were placed in a three neck Pyrex flask equipped with thermometer, mechanical stirrer, "Glass-col" heating mantle and a vacuum take-off, so that the water formed in the reaction could be removed.

The mixture was gradually heated to melt the solid diamine at around 110° C. The stirrer was then started and the mixture cooled to about 85° C. 35 parts of 55% formaldehyde solution in methanol were added slowly over a period of 30 minutes, the mixture being stirred continuously. The temperature of the reaction was permitted to drop to 50° C. where it was maintained for an additional one hour. At the end of this one hour period, the mixture was gradually heated under a reduced pressure of 30 mm. Hg to a pot temperature of 150° C., to remove the solvent and the water formed in the reaction. The viscous liquid hardener thus produced had the following properties:

Viscosity (Brookfield viscometer) at 28° C.: 1,000 poises
Amine equivalent: 120 gms./gram mole
Color (Gardener-Holdt): 16

20 parts by weight of the above hardener and 100 parts by weight of polyisocyanate prepolymer, prepared from polypropylene ether glycol adduct of 80/20 isomer mixture of tolylene diisocyanate (in the ratio of one to two), were mixed thoroughly and cured at 150° F. for 15 hours. The following typical properties were obtained:

Tensile strength, p.s.i. _____ 5,000
Elongation, percent _____ 450
Hardness, Shore A _____ 85

EXAMPLE 6

Proceeding as in Example 5, and substituting 10 parts by weight of acetaldehyde for formaldehyde, a low viscosity

EXAMPLE 11

The viscosities of the liquid hardeners prepared as in Examples 1 and 5 were also lowered by the addition of 1 to 75 percent by weight of a mixture of 70 to 75 parts by weight of 4,4'-methylene bis (2-chloroaniline) and 30 to 25 parts by weight of 3,3'-dichlorobenzidine.

The properties of polyurethanes prepared with the liquid hardener compositions as set forth in Examples 10 and 11 are shown in Table I with conventional curing powders:

TABLE I

| Hardener and plasticizer [1] | Viscosity (Brookfield), cps. at 25° C. | Amount, pbw.[2] | Working life | Tensile str., p.s.i. | Elongation, percent | Hardness, shore A |
|---|---|---|---|---|---|---|
| HB-40 (50%)[3] | 1,500 | 40 | 1 hour at 75° F | 3,600 | 460 | 78 |
| Tricresyl phosphate (50%) | 2,600 | 40 | ___do___ | 3,800 | 460 | 78 |
| Dioctyl phthalate (50%) | 1,300 | 40 | ___do___ | 3,300 | 410 | 80 |
| Dibutyl phthalate (50%) | 400 | 40 | ___do___ | 2,800 | 430 | 80 |
| Methyl pyrrolidone (30%) | 350 | 29 | 1.5 hours at 75° F | 3,500 | 475 | 80 |
| MOCA [4] | | 20 | 10 minutes at 120° F | 3,500 | 400 | 90 |
| Example 5 [5] | ([6]) | 20 | 1 hour at 75° F | 3,540 | 430 | 85 |
| Example 11 [7] | | 20 | ___do___ | 4,400 | 460 | 85 |

[1] Liquid hardener of Example 5 plus selected plasticizers (figure in parenthesis is percent of plasticizer by weight).
[2] Amount of hardener parts by weight per hundred parts of polyisocyanate prepolymer having an equivalent weight of 600.
[3] HB-40 is partly hydrogenated mixture of isomeric terphenyls made by Monsanto Chemical Co.
[4] MOCA=4,4'-methylene-bis (2 chloroaniline). Prepolymer was heated to 120° F. Molten MOCA was added and mixed thoroughly.
[5] Liquid hardener prepared as in Example 5.
[6] 1,000 poises at 28° C.
[7] Hardener prepared as in Example 11—150 parts of hardener in Example 5 plus 75 parts (25 parts 3,3-dichlorobenzidine plus 75 parts MOCA).

non-crystallizing hardener was obtained. 25 parts by weight of this curing agent were mixed with 100 parts by weight of prepolymer (amine equivalent of 600), obtaining a mixture that had a pourable working life of one hour at 75° F. A polyurethane elastomer was thus obtained having the following properties:

Tensile strength, p.s.i. _____ 2,500
Elongation, percent _____ 550
Shore hardness (A) _____ 85

EXAMPLE 7

Proceeding as in Example 5, substituting 30 parts by weight of 30% aqueous glyoxal for the acetaldehyde, a low viscosity non-crystallizing liquid hardener was obtained, which when reacted with the prepolymer, gave a polyurethane elastomer having physical properties comparable to samples cured as described in Example 6.

EXAMPLE 8

Proceeding as in Example 5, substituting 35 parts by weight of 25% aqueous glutaric dialdehyde forf ormaldehyde, a low viscosity non-crystallizing hardener was obtained. The polyurethane elastomer obtained as described in Example 5 had lower tensile strength than in Example 7; however, the elongation was better than in Example 7.

EXAMPLE 9

Proceeding as in Example 5, substituting 10 parts by weight of furfuraldehyde for formaldehyde, a low viscosity non-crystallizing hardener was obtained. The polyurethane elastomer obtained as described in Example 5 had physical properties comparable to samples cured as described in Example 6.

EXAMPLE 10

The viscosities of the liquid hardeners prepared in Examples 1 and 5 were reduced by diluting them with selected high-boiling extenders or plasticizers, including particularly tricresyl phosphate, dioctyl phthalate, dibutyl phthalate, tributyl phosphate, "HB-40," and N-methyl 2 pyrrolidone. The ratio of liquid hardener to diluents was selected so that the desired viscosity of the hardener mix was obtained, limited by the amount of the diluents that could be tolerated in the final cured product. The preferred ratio was in the range of 10 to 75 percent by weight of selected diluents, based on the final product.

Conventional compounding ingredients such as carbon black, silica, pigments and other modifying fillers, are readily dispersed with the resin-forming materials prior to the curing, because of the relatively low viscosity of the mixture prior to curing.

The advantages of the new liquid aryldiamine hardener will be understood from the above description. The hardener is non-crystalline, the curing is exceedingly simple, and the physical properties of the final product obtained are equivalent or superior to the presently used powder curing system.

I claim:

1. The process for making a liquid curing agent for urethane resin compositions comprising the steps of
   melting an aryldiamine selected from the group consisting of 4,4'-methylene-bis(2-chloraniline), 3,3'-dichlorobenzidine, and mixtures thereof;
   adding to said melted aryldiamine from ½ to 20 percent based upon the weight of the reaction product, of an active aldehyde selected from the group consisting of formaldehyde, acetaldehyde, glyoxal, and glutaric dialdehyde,
   heating said mixture for about one-half hour at a temperature of about 50° C.;
   heating the reacted mixture at 100° to 150° C. and simultaneously applying a vacuum to remove the water formed by the reaction; and
   then cooling the product to ambient temperatures.

2. The process defined in claim 1, in which the aryldiamine is 4,4'-methylene bis(2-chloroaniline).

3. The process defined in claim 1 in which the aryldiamine is 3,3'-dichlorobenzidine.

4. The process defined in claim 1 in which the aryldiamine is a mixture of 4,4'-methylene bis(2-chloroaniline) and 3,3'-dichlorobenzidine.

5. The process defined in claim 1 in which the active aldehyde is formaldehyde.

6. The process defined in claim 1 in which the active aldehyde is acetaldehyde.

7. A curing agent for urethane resin compositions comprising the reaction product of the process defined in claim 1.

8. A curing agent for urethane resin compositions comprising the reaction product of the process defined in claim 2.

9. A curing agent for urethane resin compositions comprising the reaction product of the process defined in claim 3.

10. A curing agent for urethane resin compositions comprising the reaction product of the process defined in claim 4.

11. A curing agent for urethane resin compositions comprising the reaction product of the process defined in claim 5.

12. A curing agent for urethane resin compositions comprising the reaction product of the process defined in claim 6.

References Cited

UNITED STATES PATENTS

| | | | |
|---|---|---|---|
| 2,664,408 | 12/1953 | Plump et al. | 252—148 |
| 3,194,793 | 7/1965 | Kogon | 260—77.5 |
| 3,297,758 | 1/1967 | Hoeschele | 260—570 |
| 3,397,691 | 4/1968 | Sundholm | 252—182 |
| 3,408,301 | 10/1968 | Sundholm | 252—182 |
| 3,412,071 | 11/1968 | Sundholm | 260—570 |

LEON D. ROSDOL, Primary Examiner

I. GLUCK, Assistant Examiner

U.S. Cl. X.R.

252—401, 403; 260—2.5A, 2.5AM, 77.5AM, 570D